March 24, 1925.
G. M. CLAGETT
1,530,756
PUMP FOR MOTOR VEHICLES
Original Filed July 13, 1922   2 Sheets-Sheet 1
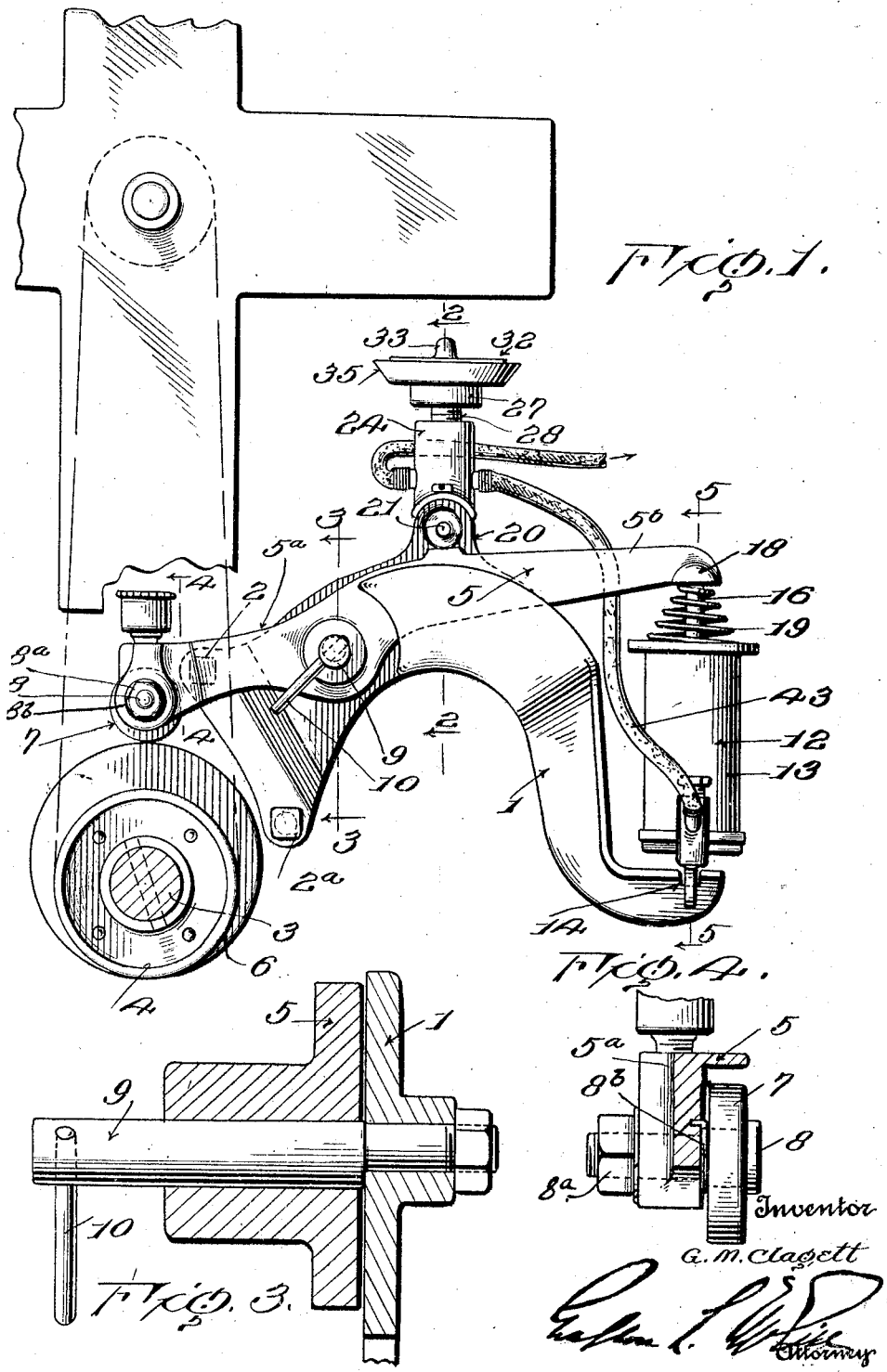

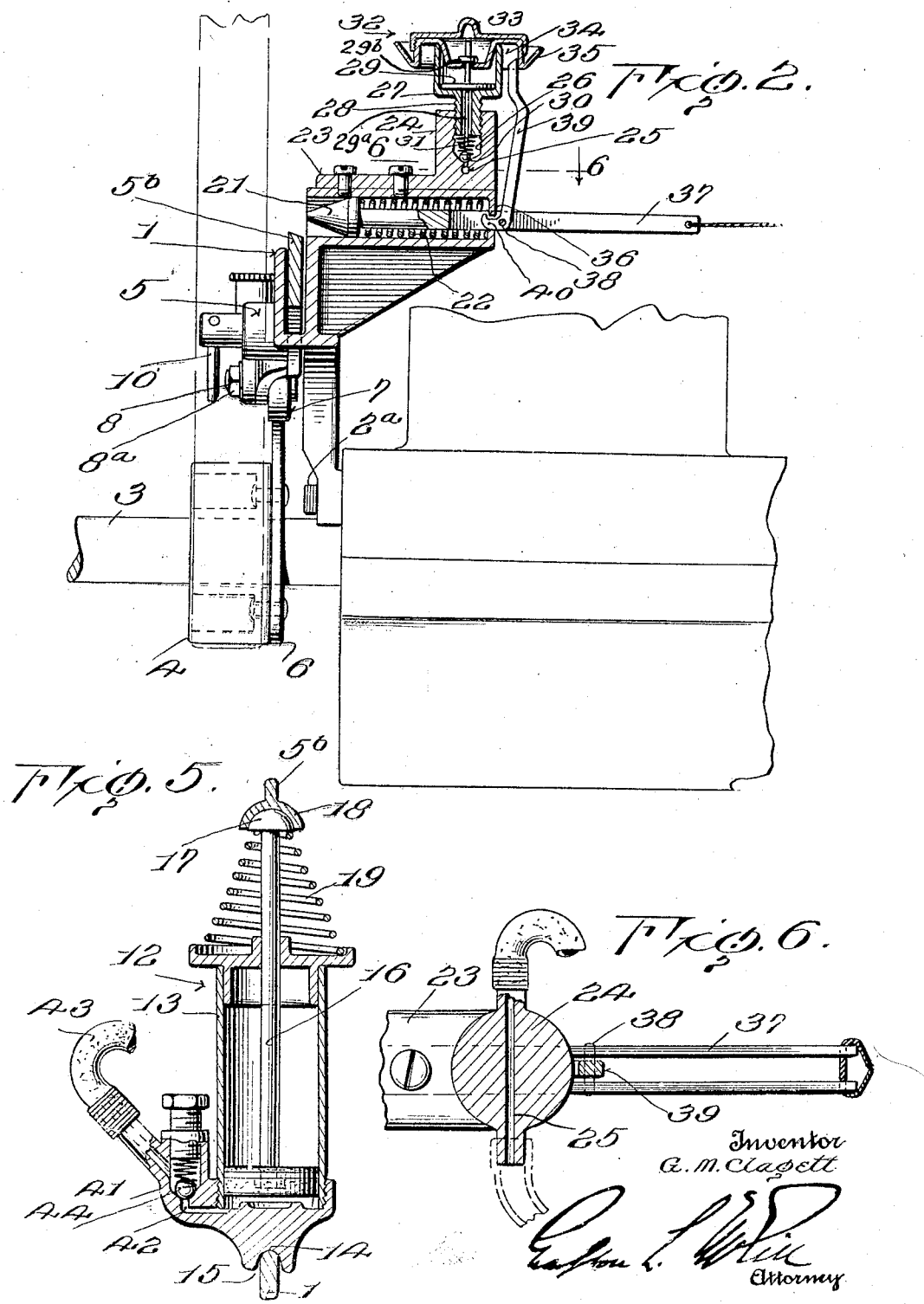

Patented Mar. 24, 1925.

1,530,756

UNITED STATES PATENT OFFICE.

GEORGE MAXWELL CLAGETT, OF UPPER MARLBORO, MARYLAND, ASSIGNOR TO GEORGE CLAGETT MANUFACTURING COMPANY, OF WASHINGTON, DISTRICT OF COLUMBIA, A FIRM CONSISTING OF GEORGE D. CLAGETT AND GEORGE M. CLAGETT.

PUMP FOR MOTOR VEHICLES.

Application filed July 13, 1922, Serial No. 574,675. Renewed January 4, 1924.

*To all whom it may concern:*

Be it known that I, GEORGE M. CLAGETT, of Upper Marlboro, in the county of Prince Georges, State of Maryland, have invented certain new and useful Improvements in Pumps for Motor Vehicles; and I do hereby declare the following to be a full, clear, and exact description of the invention, such as will enable others skilled in the art to which it appertains to make and use the same.

The pump forming the subject matter of my present invention has been designed primarily for attachment to motor vehicles as a tire pump and to be operated by a moving part of the engine, but it will be understood that the invention is capable of other adaptations.

It has been heretofore proposed to apply mechanically operated air pumps to motor vehicles and to employ a moving part of an engine as an actuating means for such pumps. These pumps have enjoyed but very limited commercial success and have not been extensively used because of the more or less complicated means employed for actuating the pump plunger which means commonly includes a number of parts which soon become loose and rattle or which include more or less fragile elements which soon become damaged and refuse to function properly. A number of types of vehicle air pumps must be detached from the vehicle when not in use and this is obviously a very objectionable feature. My invention, therefore, contemplates the provision of a pump which will be available for use as a vehicle engine driven air pump and one which involves but few parts in compact association for overcoming the aforementioned objections. Additionally, it is my aim to furnish a pump which may be set in operation at any time while the vehicle engine is running, a novel and improved means being employed for stopping the pumping operation and retaining the pump in inoperative position, which means may by the use of a novel pressure responsive device be rendered automatically effective when a predetermined pressure has been created in a tire.

A further object of this invention is the provision of a novel and improved support for the pump cylinder including a fixed member which cooperates with an oscillatory plunger actuating member for holding the pump cylinder and associated elements in proper position, yet at the same time being so arranged as to permit ready detachment of the cylinder for purposes of inspection without necessitating the tampering with or manipulation of other portions of the mechanism.

Various simple and effective means are availed of for assuring a proper cooperation of the pump actuating member with a driven element of the engine.

The various features of novelty which characterize my invention are pointed out with particularity in the claims annexed to and forming a part of this specification. However, in order that the invention may be better understood, reference should be had to the accompanying drawings and descriptive matter which set forth what I now regard as a preferred structure, it being understood, however, that a multiplicity of changes and variations may be made therein within the spirit and scope of the claims.

In the drawings,

Figure 1 is a side elevation embodying my improvements applied to a motor vehicle engine; Figs. 2, 3, 4 and 5 are sections, respectively, on the lines 2—2, 3—3, 4—4 and 5—5 of Fig. 1; and Fig. 6 is a sectional view taken on line 6—6 of Fig. 2.

Referring specifically to the drawings, wherein like reference characters have been used to designate similar parts throughout all views, numeral 1 denotes a bracket or casting adapted to be secured to the forward end of the vehicle engine adjacent the fan by means of bolts 2 and $2^a$, which also serve in the well known Ford and other makes of cars for holding the front cover plate of the engine housing in place. It will be noted, therefore, that the attachment of my bracket 1 obviates the necessity of drilling additional bolt holes in the engine front and necessitates the use of no bolts or fasteners other than those having a normal function in the engine assembly.

An oscillatory lever 5 is fulcrumed in the bracket 1 and its function, briefly stated, is to convert the rotary movement of a cam member 6 into oscillatory movement for working the plunger of the pump, one arm $5^a$ of said lever having normal contact with the cam through the medium of an eccentric roller 7 in its end, while the other arm 5ᵇ engages the outer end of the pump plunger. I have shown in the drawings an acceptable application of the cam 6, the same being carried by the fan belt pulley 4 upon the crank shaft 3. It will be understood, however, that the cam disk 6 may be keyed or otherwise secured to the crank shaft as may be found expedient. The roller 7, as intimated, is journaled upon a beaded stub shaft 8 insertable through an aperture in the end of the arm 5ᵃ, a nut 8ᵃ threaded on the shaft holding a shoulder of said shaft against said arm. A tension washer 8ᵇ encompasses the aforementioned shoulder, being interposed between the arm 5ᵃ and the roller 7 and having a seat in a shallow circumferential groove in said arm as shown in Figure 4. Thus the nut 8ᵃ having been tightened to cause the shoulder 8ᶜ to bind against the arm 5ᵃ, it will be evident that the tension washer 8ᵇ will now bear against the roller 7 with enough force to hold the same against spinning when out of contact with the cam 6, but not so tight as to prevent rotation of the roller when in contact with the cam. The roller 7 serves to reduce friction and the reason for the eccentric character thereof will be apparent hereinafter. Spring washer 8ᵇ also, of course, holds the nut 8ᵃ tight.

It is essential that the parts be capable of ready adjustment to assure a proper contact between the eccentric roller 7 and the cam disk 6, and to this end I render the lever 5 adjustable in a vertical plane by employing, as a fulcrum point therefor, the medial eccentric portion of a bolt 9. This blot 9 extends through the bracket and a pin 10 is provided extending transversely therefrom to serve as an indicator of the position of the eccentric portion and also as a handle for turning the bolt for moving the lever bodily to a desired position and adjustment with respect to the cam disk 6 and the pump cylinder.

The pump proper is indicated generally at 12, and its cylinder 13 is freely supported for universal movement on the bracket 1, which, as shown, is formed with a recess 14, while the casting below the bottom of the cylinder 13 is provided with a notch 15 whose walls straddle the recess 14 as clearly shown in Figs. 1 and 5. As a consequence it will be appreciated that there is ample range of movement of the cylinder with respect to its support.

The piston has its rod 16 extending through the top of the cylinder and the extremity of this piston rod 16 is formed with a convex head 17 which is adapted to be received within the cupped portion 18 at the end of the lever arm 5ᵇ. A spring 19 which is preferably of conical form is coiled around the piston rod 16, one end bearing upon the top or head of the cylinder, which by the way is removable and held in place by the spring, while the other or apex end of the spring abuts against the convex head 17 at the end of the rod to hold it in the cup 18 of the arm 5ᵇ.

As will be apparent the spring 19 functions, both while the pump is in operation and at rest, to demountably maintain the same in association with the bracket 1 and the arm 5ᵇ, by normally pressing the piston rod head 17 into the cup 18 of the arm 5ᵇ and at the same time pressing the cylinder against the bracket 1 to retain its notch 15 in the bracket recess 14.

Additionally it should here be emphasized that the spring 19 serves to return the piston to its elevated or starting position after each working impulse from the arm 5ᵇ, this upward pressure of the spring also acting through the piston rod head 17, cup 18 and arm 5ᵇ to normally maintain the eccentric roller 7 of the arm 5ᵃ in frictional contact with the cam 6 and to prevent rattling of the parts.

In connection with the convex piston rod head and the cupped end 18 of the arm 5ᵇ it will be observed that here again is a universal connection which permits the whole pump 12 to be readily tilted to conform to the position of the lever 5, and further when it is desired to remove the pump 12 from its location it is only necessary to compress the spring 19 and plunger 16 to disengage the convex head 17 from the cup 18 whereupon the pump 12 may be lifted out very conveniently for examination or adjustment.

To the end that the lever 1 may be locked and effectually maintained in ineffective position when the pump is not to be used, I have provided a locking mechanism which in the illustrated form embraces a sleeve 20 which is formed upon the bracket 1 adjacent the arm 5ᵇ of the lever. A trigger controlled pin 21 is movable in this sleeve 20 and its conical end is normally urged by a spring 22 to bear upon the arm 5ᵇ for holding the same depressed. This pin urged by the spring 22, cooperates with the roller 7, which is eccentric, to automatically lock the lever 5 so that the roller 7 is completely out of engagement with the cam 6. This takes place when the high points of the roller and cam come together in the course of movement. When the cam and roller are in this position, the pin 21 upon being released moves forward over the lever 5, to its maximum point of travel for holding the lever arm 5ᵇ depressed against the tension of the spring 19. The high point of the cam 6 in the course of movement comes in contact with the high point of the roller, urging it forward and thus causing a lower point of the roller to be presented towards the cam, it being remembered that the tension washer 8ᵇ will prevent further rotation of the eccentric roller 7.

I also provide means for retracting the pin 21 and holding it against the pressure of the spring 22 by means of a trigger device, and as I prefer that the pin be automatically released at a predetermined air pressure, I provide to that end a housing 23 having an upright portion which as shown is mounted upon the sleeve 20. This upright portion 24 is transversely bored as at 25 and has a longitudinal recess 26 connected with a narrow passage leading from the bore. A cylinder 27 has a depending boss 28 tapped in the recess 26. In this cylinder there is provided a piston 29 having a rod 29ᵃ one end of which passes through a longitudinal bore in the boss. A ball valve 30 governs the passage of air into the recess 26 from the bore 25 and a spring 31 of conical form has its reduced end normally bearing upon the ball while its other end contacts with the end of the boss 28. The cylinder 27 may thus be turned inward or outward to increase or lessen the tension of the spring 31 acting upon the ball valve 30 and thereby determine the amount of air pressure necessary to raise the ball and permit air to enter the recess 26 for acting upon the plunger 29 to release the latch mechanism 21 as will be hereinafter apparent.

There is supported upon the upper end of the cylinder 27 for vertical sliding movement a cap assembly 32 which, as shown, comprises two plates spaced apart at their central portions, the lower plate being centrally apertured to create a bearing for the piston rod 29ᵃ, while the upper plate has a recess 33 to receive the extremity of the rod. Thus it will be appreciated that elevation of the plunger 29 with its rod 29ᵃ will result in the elevation of the cap assembly 32 whereby a latch member having a tendency for outward movement will be released from an annular groove 34 provided in the under surface of the cap assembly 32.

The sleeve 20 is formed with an inward flange 36 at its outer open end, and as shown at 37 in Fig. 2 a plunger is attached to the pin 21 and projects from the open end of the sleeve 20. This plunger 37 may be projected by any appropriate device, the same being of channeled form as shown in Fig. 6. Upon its transverse pin 38 is fulcrumed a trigger 39 formed with a hook 40 at its inner end and having its outer extremity beveled.

While the pin 21 is holding the lever 5 locked, the trigger lies within the channel of the plunger 37 and both extend into the sleeve 20. As the plunger 37 is retracted carrying with it the pin 21, the trigger travels along with it lying flatly in the channel until the hooked end 40 engages the flange 36 at the end of the sleeve whereupon it is caused to swing upward on its pivot pin 38. This upward movement of the trigger 39 results in the contacting of the beveled extremity thereof with the upwardly beveled circumferential flange 35 of the cap assembly 32 adjacent the groove 34 and the consequent raising of the cap assembly to permit the end of the trigger to seat in the groove 34. In this movement the cap moves slightly upward and tilts to one side, it being here noted that the plunger 29ᵃ is provided with a shoulder or enlargement 29ᵇ between the two plates of the cap assembly to prevent displacement of the same.

With the parts in the position of Fig. 2, the lever 5 is released and free to work the pump when the engine is started.

Referring now to Figs. 1 and 5, the cylinder 13 has a small offset 41 at its base through which the compressed air passage 42 leads to a tube 43, an adjustable ball check valve 44 being employed in connection with the passage 42 to prevent the escape of air from the tube while the piston is returning from a working stroke.

The parts being in the positions of Fig. 2, the pump 12 is working and the air is being forced through tube 43 and housing 24 to a tire, the motor vehicle being standing while its engine is running. When the pressure reaches the point for which spring 31 is set the ball 30 rises and allows the air to force piston 29 upward, the piston rod entering recess 33. This lifts the cap 32 straight up thus releasing the trigger 39 and allowing it to fall into plunger 37 as the two are drawn into sleeve 20 under the tension of spring 22. This projects pin 21 over lever arm 5ᵇ and locks the lever against movement.

A feature of the tube 43 is that it acts as a reservoir which stores up enough elastic air to render the supply partially independent of the pump action. But for this feature one compression stroke of the pump might unseat ball 30 and release the trigger before adequate air had been supplied to the tires.

By the structure described it will be seen that I have provided a practical pump that can be installed without the necessity of "lining up" and fitting and at the same time one that may be readily and without difficulty taken apart.

I claim as my invention:—

1. In a pump for motor vehicles, a crank shaft forming part of the car mechanism, a cam on said shaft, a bracket secured to the engine frame, a lever fulcrumed on said bracket, an eccentric roller mounted on one end of the lever, a cylinder mounted on said bracket and having a piston rod engaging the opposite end of said lever, and means for locking said lever to stop the operation of the pump.

2. In a pump for motor vehicles, a crank shaft forming part of the car mechanism, a cam on said shaft, a bracket secured to the engine frame, a lever fulcrumed on said bracket, a frictionally held eccentric carried by one end of said lever, a cylinder supported by said bracket and having a piston rod engaging the opposite end of said lever, and means for locking said lever to stop the operation of the pump.

3. In a pump for motor vehicles, a crank shaft forming part of the car mechanism, a cam on said shaft, a bracket secured to the engine frame, a lever fulcrumed on said bracket, a frictionally held eccentric carried by one end of said lever, a cylinder universally supported by said bracket, a piston rod working within the cylinder and engaging the opposite end of said lever, and means for locking said lever to stop the operation of the pump.

4. In a pump for motor vehicles, a crank shaft forming part of the car mechanism, a cam on said shaft, a bracket secured to the engine frame, a lever fulcrumed on said bracket, a cylinder universally supported by said bracket, a piston rod removably supported within the cylinder and engaging one end of said lever, a frictionally held roller carried by the opposite end of the lever and engaging the cam, and automatic means for locking said lever to stop the operation of the pump.

5. In a pump for motor vehicles, a crank shaft forming part of the car mechanism, a cam on said shaft, a bracket secured to the engine frame, a lever fulcrumed on said bracket, a cylinder having a forked end straddling the bracket for removably and universally supporting the same, a piston removably supported in the cylinder and having a piston rod having a universal engagement with one end of said lever and the opposite end of the lever engaging the said cam, and automatic means for locking said lever to stop the operation of the pump.

6. In a motor vehicle, a pump, means for actuating said pump by the vehicle engine, a spring pin tending to lock said pump actuating means, means for retracting said pin to render it ineffective, a tube leading from said pump to a point of use, and means located in the line of said tube and operated by the pressure for releasing said pin.

7. In a pump for motor vehicles, a crank shaft forming part of the car mechanism, a cam on said shaft, a bracket secured to the engine frame, a lever fulcrumed on said bracket, a frictionally held eccentric roller supported by one end of the lever, a cylinder having a forked projection straddling one end of the bracket for removably and universally supporting the same thereon, a piston removably supported within the cylinder, a piston rod carried by the piston and having a universal connection with the opposite end of said lever, and means for locking said lever to stop the operation of the pump.

8. The combination with a motor vehicle, a crank shaft forming part of the car mechanism, a cam on said shaft, a bracket secured to the engine frame, a lever intermediately fulcrumed on said bracket, an eccentric roller rotatably mounted upon one end of the lever, a frictional means for preventing the roller from spinning on the lever, a cylinder universally supported by one end of the said bracket, a head loosely closing the upper end of the cylinder, a piston rod extending through the head and having at its upper end a universal connection with the opposite end of the lever, a spring surrounding the piston rod between the head and the lever, and automatic means for locking said lever to stop the operation of the pump.

9. In a pump for motor vehicles, a crank shaft forming part of the car mechanism, a cam on said shaft, a bracket secured to the engine frame, a lever adjustably fulcrumed on said bracket, an eccentric roller carried by one end of said lever and held against spinning, a cylinder supported by said bracket and having a piston rod engaging the opposite end of said lever, and means for locking said lever to stop the operation of the pump.

10. In a pump for motor vehicles, a crank shaft forming part of the car mechanism, a cam on said shaft, a bracket secured to the engine frame, a lever fulcrumed on said bracket, a frictionally held eccentric carried by one end of said lever, a cylinder freely supported by said bracket, a piston rod working within the cylinder and engaging the opposite end of said lever, and means for locking said lever to stop the operation of the pump.

11. In a pump for motor vehicles a crank shaft forming part of the car mechanism, a cam on said shaft, a bracket secured to the engine frame, a lever adjustably fulcrumed on the engine frame, a frictionally held eccentric carried by one end of said lever, a cylinder freely supported by the engine frame and having a piston rod engaging the opposite end of said lever and means for locking said lever to stop the operation of the pump.

12. In a pump for motor vehicles, a crank shaft forming part of the car mechanism, a cam on said shaft, a bracket secured to the engine frame, a lever adjustably fulcrumed on said bracket, a frictionally held eccentric carried by one end of the lever, a cylinder freely supported by said bracket, a piston rod working in the cylinder and freely engaging the opposite end of the lever, a spring surrounding the piston rod and having one end engaging the cylinder head and the opposite end engaging the piston rod and holding it against the lever whereby the eccentric is held in engagement with the cam and the cylinder held on the bracket.

13. In a pump for motor vehicles, a crank shaft forming part of the car mechanism, a cam on said shaft, a bracket secured to the engine frame, a lever adjustably fulcrumed on said bracket, a cylinder universally supported by said bracket, a piston rod removably supported within the cylinder and engaging one end of said lever, a frictionally held roller carried by the opposite end of said lever and engaging the cam and automatic means for locking said lever to stop the operation of the pump.

14. In a pump for motor vehicles, a crank shaft forming part of the car mechanism, a cam on said shaft, a bracket secured to the engine frame, a lever adjustably fulcrumed on said bracket, a cylinder universally supported by said bracket, a piston, a piston rod removably supported within the cylinder and engaging one end of said lever, a frictionally held roller carried by the opposite end of the lever and engaging the cam, automatic means for locking the said lever to stop the operation of the pump, and means for manually releasing said locking means.

15. In a pump for motor vehicles, a crank shaft forming part of the car mechanism, a cam on said shaft, a bracket secured to the engine frame, a pivoted lever adjustably mounted on said bracket, an eccentric roller mounted on one end of the lever, a cylinder mounted on said bracket and having a piston rod engaging the opposite end of said lever, and means for locking said lever to stop the operation of the pump.

16. In a pump for motor vehicles, a crank shaft forming part of the car mechanism, a cam on said shaft, a bracket secured to the engine frame, a lever adjustably mounted on said bracket, a cylinder freely seated on said bracket, a piston rod working in the cylinder and universally seated at the opposite end of the lever.

17. In a pump for motor vehicles, a crank shaft forming part of the car mechanism, a cam on said shaft, a bracket secured to the engine frame, a lever adjustably mounted on said bracket, a cylinder freely seated on said bracket a piston rod working in the cylinder and engaging the opposite end of the lever, and a spring surrounding the piston rod and having one end engaging the cylinder head and the opposite end engaging the piston rod and holding it against the lever whereby the eccentric is held in engagement with the cam and cylinder and piston rod held seated.

18. In a pump for motor vehicles, a crank shaft forming part of the car mechanism, a cam on said shaft, a bracket secured to the engine frame, a pivoted lever adjustably mounted on said bracket, a spring tension eccentric roller mounted on one end of the lever, a cylinder mounted on said bracket and having a piston rod universally engaging the opposite end of said lever, and means for locking said lever to stop the operation of the pump.

19. In a pump mechanism a crank shaft, forming part of the car mechanism, a cam on said shaft, a rocker arm adjustably fulcrumed, a frictionally held eccentric roller, carried by one end of said rocker arm, a freely seated cylinder, a piston rod within the cylinder, a spring interposed between the cylinder and the head of said piston rod to cause the end of said piston rod to bear against its seat on said rocker arm.

20. In a pump mechanism, a crank shaft forming part of the car mechanism, a cam on said shaft, a bracket secured to the engine frame, a rocker arm adjustably fulcrumed, a frictionally held eccentric roller carried by one end of said rocker arm, a cylinder freely seated on said bracket, a piston within the cylinder, a piston rod carried by the piston and a spring interposed between the cylinder and the upper end of the piston rod to cause the outer end of said piston rod to bear against its seat on said rocker arm.

21. In a pump mechanism, a rocker arm fulcrumed, a frictionally held eccentric roller carried by said rocker arm, a cylinder freely supported, a piston within the cylinder, a piston rod carried by the piston and extending out through a freely seated cylinder head, a spring interposed between the cylinder head and the free end of the piston rod and means to variably adjust said mechanism to an actuating means.

22. In a pump mechanism a crank shaft forming part of the car mechanism, a cam on said shaft, a bracket secured to the engine frame, a rocker arm adjustably fulcrumed on said bracket, a frictionally held eccentric roller carried by one end of said rocker arm, a cylinder freely seated on said bracket, a cylinder head freely seated on said cylinder and carrying a piston rod fitted with a piston, means interposed between the head of said piston rod and said cylinder head to cause the head of said piston to bear against its seat on said rocker arm.

23. In a pump mechanism a bracket, a rocker arm fulcrumed thereon, a frictionally held eccentric roller carried by one end of said rocker arm, a cylinder freely seated on said bracket, a cylinder head freely seated on said cylinder and carrying a piston rod fitted with a piston, spring means interposed between the piston head and said cylinder head and means to variably adjust said mechanism to an actuating means.

24. In a pump mechanism, a crank shaft forming part of the car mechanism, a cam thereon, the combination of a bracket, a rocker arm thereon, a cylinder assembly consisting of a cylinder, a freely supported head thereon, a piston rod supported by said head and having a piston thereon, said assembly being supported by said bracket and said rocker arm and means for variably adjusting said combination to the action of said cam.

25. In a pump mechanism for motor vehicles, a lever fulcrumed on a support, an eccentric roller mounted on said lever and means to prevent said eccentric roller from spinning freely, a cylinder universally and freely seated on a support, a cylinder head seated against said cylinder and carrying a piston rod fitted with a piston, said piston rod being universally seated against said lever, means interposed between the head of said piston rod and said cylinder to cause said cylinder to bear against said support, to cause said cylinder head to bear against said cylinder and to cause the head of said piston rod to bear against said lever, means to automatically lock said lever to hold it in operation and means to variably adjust said mechanism of an actuating means.

26. In a pump mechanism a crank shaft forming part of the car mechanism, a cam on said shaft, a rocker arm adjustably fulcrumed, a frictionally held eccentric roller, carried by one end of said rocker arm, a freely seated cylinder, a piston rod within the cylinder, a spring interposed between the cylinder and the head of said piston rod to cause the end of said piston rod to bear against its seat on said rocker arm, and means to reciprocate the stroke of said piston.

27. The combination with a pump including a cylinder and a reciprocatory piston; of a support upon which said cylinder is freely supported, an actuating member connected with said piston, and resilient means interposed between said member and said cylinder cooperating with said support for retaining the cylinder in position.

28. The combination with a pump including a cylinder and a reciprocatory piston; of a support for frictionally supporting said cylinder for universal movement, and actuating means cooperating with said piston for reciprocating the same and cooperating with said cylinder and support for removably maintaining the pump in position.

29. The combination with a pump including a cylinder, a removable head, and a reciprocatory piston having a plunger rod extending through said head; of a support for freely supporting said cylinder, a mechanically operated member having frictional engagement with said plunger rod and movable to engage a driven element for reciprocating said plunger, and resilient means interposed between said cylinder head and said actuating member cooperating with said cylinder, its support, head and said movable member for maintaining the pump cylinder in position and retaining said head in place.

30. The combination with a pump including a cylinder and reciprocatory piston; of a support upon which said cylinder is adapted to frictionally rest, means for reciprocating said piston and cooperating with said cylinder for removably positioning the same upon its support, driving means for said piston reciprocating means, and pressure-controlled means for disconnecting said piston actuating means from said driving means.

31. In a pump for motor vehicles including a cylinder, a reciprocatory piston carried within said cylinder and having a plunger rod extending therefrom, the combination of a support upon which said cylinder freely rests, a lever fulcrumed on said support and cooperating with said plunger rod for retaining the cylinder seated on the support, variable means for moving said lever to operative engagement with a moving part of the vehicle engine for reciprocating said plunger rod and piston, and means for yieldably urging said lever in the direction of the moving part aforementioned.

32. In a pump for motor vehicles including a cylinder, a reciprocatory piston carried within said cylinder and having a plunger rod extending therefrom, the combination of a support upon which said cylinder freely rests, a lever fulcrumed on said support and cooperating with said plunger rod for retaining the cylinder seated on the support, variable means for moving said lever to operative engagement with a moving part of the vehicle engine for reciprocating said plunger rod and piston, means for yieldably urging said lever in the direction of the moving part aforementioned, and means for automatically locking said lever out of engagement with said moving part at a predetermined time.

33. In a pump mechanism for motor vehicles, a crank shaft forming a part of the car mechanism, a pulley keyed to said shaft, a cam on said pulley, the combination of a bracket, a rocker arm thereon, a cylinder assembly freely supported upon said bracket and consisting of a cylinder, a freely supported head thereon, a piston rod extending through said head and having an abutment at its outer end, means interposed between the abutment of said piston rod and the cylinder head cooperating with said lever to cause said cylinder to bear upon its seat upon said bracket, the remote portion of said lever cooperating with said cam whereby the lever will be oscillated, and means for locking said cylinder assembly in a position at which said lever will be out of engagement with said cam.

34. In a pump mechanism for motor vehicles, a support, a pump actuating lever fulcrumed upon said support, a roller mounted on said lever, means to prevent said roller from spinning freely, a cylinder seated upon said support, a cylinder head freely supported by said cylinder, a piston within said cylinder having a rod extending through said cylinder head, an enlargement at the outer end of said piston rod and having a universal seat against said lever, means interposed between the cylinder head and said rod enlargement, cooperating with said lever to cause said cylinder to bear against its seat on said support, means to variably adjust said mechanism to an actuating means and means to automatically lock said mechanism out of engagement with an actuating means.

35. In a pump mechanism for motor vehicles, a support, a pump actuating lever fulcrumed on said support, a roller mounted on said lever, means to prevent said roller from spinning freely, a cylinder freely seated on said support, a cylinder head freely supported by said cylinder and carrying a piston rod fitted with a piston, the piston rod being also provided with an enlargement at its outer end, means interposed between the cylinder head and said piston rod enlargement to cause the latter to bear against the lever, the latter having a seat to receive the same, means to automatically lock said mechanism out of engagement with an actuating means, and means to variably adjust said mechanism to an actuating means.

36. In a pump mechanism, a support, an actuating lever fulcrumed on said support, a roller mounted on said lever, means to prevent said roller from spinning freely, a cylinder seated against said support, a cylinder head freely supported by said cylinder and carrying a piston rod fitted with a piston and having a head at its outer end, means interposed between said rod head and said cylinder head to cause the latter to bear against its seat in said cylinder, means to variably adjust said mechanism to associate said lever with a driving means, and means to automatically lock said mechanism in position to maintain said lever out of engagement with a driving means.

37. The combination with an oscillatory member and a rotary cam driving means therefore with which said member has normal contact; of an eccentrically mounted roller carried by said oscillatory member and forming the contact with said cam means, and means for preventing said eccentric roller from spinning freely when out of contact with said cam means.

38. The combination defined in claim 38 and including means actuatable for maintaining said oscillatory member stationary when the high points of said cam means and roller come together.

In testimony whereof I have signed this specification.

GEORGE MAXWELL CLAGETT.